(12) United States Patent
Sau

(10) Patent No.: US 6,809,132 B2
(45) Date of Patent: Oct. 26, 2004

(54) SUPPRESSION OF AQUEOUS VISCOSITY OF ASSOCIATING POLYACETAL-POLYETHERS

(75) Inventor: Arjun C. Sau, New Castle County, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 10/003,755

(22) Filed: Oct. 29, 2001

(65) Prior Publication Data

US 2003/0171459 A1 Sep. 11, 2003

(51) Int. Cl.$^7$ .............................. C08L 3/02; C08L 5/16
(52) U.S. Cl. ............................ 524/48; 524/38; 524/44; 106/176; 106/217
(58) Field of Search ............................ 524/38, 48, 44; 106/217, 176

(56) References Cited

U.S. PATENT DOCUMENTS 5,137,571 A * 8/1992 Eisenhart et al. ........... 106/217
5,376,709 A * 12/1994 Lau et al. .................... 524/48

* cited by examiner

Primary Examiner—James J. Seidleck
Assistant Examiner—U. K Rajguru
(74) Attorney, Agent, or Firm—David Edwards

(57) ABSTRACT

A composition is composed of a hydrophobically modified polyacetal-polyether (HM-PAPE) or comb hydrophobically modified polyacetal-polyether (comb HM-PAPE) and a viscosity suppressing agent of cyclodextrins or derivatives thereof. A method for improving the pumpability and pourability of aqueous solutions of HM-PAPE or comb HM-PAPE is provided by admixing a cyclodextrin with the HM-PAPE or comb HM-PAPE to form a complex of the cyclodextrin and HM-PAPE or comb HM-PAPE where the viscosity of the HM-PAPE or comb HM-PAPE is suppressed and adding the complexed admixture to an aqueous system containing a water-insoluble polymer wherein the cyclodextrin is decomplexed and the HM-PAPE or comb HM-PAPE becomes an effective thickener. An example of the uses for this composition and method is in film forming coatings such as latex paints.

23 Claims, No Drawings

SUPPRESSION OF AQUEOUS VISCOSITY OF ASSOCIATING POLYACETAL-POLYETHERS

FIELD OF THE INVENTION

This invention relates to controlling the solution viscosity and other rheological properties of associative thickeners in aqueous media. More particularly, this invention relates to aqueous formulations of hydrophobically modified polyacetal-polyethers (HM-PAPEs) and cyclodextrins to suppress and control the solution viscosity of such thickeners. This invention also relates to the use of these associative thickener formulations in systems that are to be thickened such as water-borne paints.

BACKGROUND OF THE INVENTION

Highly filled aqueous systems, such as water-borne coatings (latex or emulsion paints), inks, construction materials, and cosmetics are formulated with hydrophobically modified water-soluble polymers (HM-WSPs) to control the rheology of coatings during manufacturing, storage and applications. These HM-WSPs are commonly referred to in the art as "associative thickeners". They are so called because they thicken the latex paints by forming a three-dimensional network through intermolecular associations of the hydrophobic moieties present in the HM-WSP chains and/or with other hydrophobic components present in the coatings formulation. Water-borne architectural coatings are used for on-site application to interior or exterior surfaces of residential, commercial, institutional, or industrial buildings. Associative thickeners have become the industry standards as the rheology modifiers in paints because they have a number of advantages over conventional thickener systems. These include: (1) a lower viscosity during incorporation, (2) a lower tendency to spatter during application, (3) good flow and leveling upon application, (4) better color, (5) higher gloss through less flocculation, (6) lower sensitivity of the coatings to water, (7) less vulnerability to microbial degradation, and (8) minimal reduction in the viscosity of the thickened dispersions on exposure to shearing (approaching Newtonian flow behavior).

These associative thickeners are normally sold as high solids solutions in water or a mixture of water and an organic cosolvent, such as butyl carbitol or propylene glycol. The function of these cosolvents is to suppress the viscosity of the aqueous solution containing the associative thickener to allow for ease of handling before it is used as a thickener. While these organic cosolvents perform their intended function, they possess potential environmental, safety, and health problems. These organic cosolvents contribute to volatile organic compounds (VOCs) which are not environmentally friendly. Since these VOCs potentially harm the atmosphere, environmentalists are getting bills passed in the Government in order to reduce the VOCs emitted into the atmosphere. Hence, companies that produce or market formulations that produce large volumes of VOCs are being required either to reduce the level of VOCs or to eliminate them all together. Companies in the paint industry are now concerned about VOCs and are asking their suppliers to provide environmentally friendly products with low or no VOCs.

One approach to suppress the aqueous viscosity of associative thickeners and yet be environmentally friendly is to use surfactants in the paint. Although this presents no specific health or environmental hazard, it does degrade formulation performance. U.S. Pat. No. 6,150,445 describes the use of nonionic surfactants in small amounts, which owing to their micelle-forming capability can reduce the viscosity of the aqueous concentrate of the associative thickener.

Another approach is described in U.S. Pat. Nos. 5,137,571 and 5,376,709 that disclose the use of cyclodextrins or their derivatives to suppress the solution viscosity of hydrophobically modified ethoxylated polyurethanes, hydrophobically modified alkali-soluble emulsions, hydrophobically modified hydroxyethylcellulose, or hydrophobically modified polyacrylamides.

Another approach is to reduce the molecular weight of the associative thickener so that no viscosity suppressant is needed to prepare high solids solutions in water with manageable viscosity.

Recently, the compositions and applications of a new class of associative thickeners based on hydrophobically modified polyacetal (ketal)-polyether were described in U.S. Pat. Nos. 5,574,127 and 6,162,877. Compared to many existing associative thickeners (see U.S. Pat. No. 5,574,127), these polymers were useful as rheology modifiers for highly filled aqueous systems at very high pHs to provide the desired properties. However, like many high molecular weight associative thickeners, these polymers exhibit high viscosity at high solids solutions in water. Consequently, their use in many commercial applications is restricted.

Therefore, to widen the utility of these associative thickeners, it is desirable to develop means to lower their high solids solution viscosity. The present invention is directed to address this issue.

SUMMARY OF THE INVENTION

The present invention is directed to a composition comprising a dry blend of a) a hydrophobically modified polyacetal-polyether (HM-PAPE) or comb HM-PAPE and b) a viscosity suppressing agent selected from cyclodextrins and derivatives thereof. Optionally, this dry blend can be heated to fuse the materials together to form a solid mass.

This invention also relates to a method for improving the pumpability and pourability of aqueous solutions of HM-PAPE or comb HM-PAPE comprising admixing a cyclodextrin with the HM-PAPE or comb HM-PAPE to form a complex of the cyclodextrin and HM-PAPE or comb HM-PAPE where the viscosity of the HM-PAPE or comb HM-PAPE is suppressed and adding the complexed admixture to an aqueous system containing a water-insoluble polymer wherein the cyclodextrin is decomplexed and the HM-PAPE or comb HM-PAPE becomes an effective thickener.

DETAILED DESCRIPTION OF THE INVENTION

It has been surprisingly found that blends of HM-PAPE and cyclodextrin can make a high solids, low viscosity blend that when added to an aqueous medium can form pumpable and pourable slurries or solutions at low water concentrations all the way up to substantially clear homogeneous solutions at medium to high water concentrations.

The polymers of this invention are substantially completely soluble in water at ambient temperatures and have been found to efficiently thicken various water-based systems including latex paints. They also provide an improved combination of paint properties (stability, flow and leveling, film build, spatter resistance, and sag resistance). These polymers are associative thickeners that have a backbone of poly(acetal- or ketal-polyether) with ends that are capped with hydrophobic groups independently selected from the group of alkyl, aryl, arylalkyl, cycloaliphatic, perfluoroalkyl, carbosilyl, polycyclyl, and complex dendritic groups. The hydrophobe content of the polymers of this invention has a lower limit of 8 carbons, preferably 10 carbons, and more preferably 12 carbons. The upper limit of the hydrophobe content is generally 40 carbons, preferably 28 carbons, and more preferably 18 carbons. These polymers are called hydrophobically modified polyacetal-polyether (HM-PAPE) and are marketed by Hercules Incorporated, Wilmington, Del., under the trademark Aquaflow.

According to the present invention, the HM-PAPEs are prepared by copolymerizing an alpha, omega-diol, -dithiol, or -diamino polyether or a mixture of these reagents with a gem-dihalide compound in the presence of a base to form an alpha, omega-diol, -dithiol, or -diamino poly(acetal- or ketal-polyether) which in turn is reacted with hydrophobic reagents to form the final product.

The hydrophobically modified comb polymers also have poly(acetal- or ketal-polyether) backbone with pendant hydrophobes. These comb polymers are prepared by 1) copolymerizing water-soluble polymers bearing alpha, omega-active hydrogen, 2) hydrophobic compounds having alpha, omega-active hydrogen atoms or their alkoxylated derivatives, and 3) dihalogeno compounds or their derivatives in the presence of a base for a sufficient time. Additionally, the ends of these polymers are capped with hydrophobes. As in the HM-PAPE, the hydrophobe content of the comb HM-PAPE polymers of this invention has a lower limit of 8 carbons, preferably 10 carbons, and more preferably 12 carbons. The upper limit of the hydrophobe content is generally 40 carbons, preferably 20 carbons, and more preferably 18 carbons The HM-PAPEs and comb HM-PAPEs are described in more detail in U.S. Pat. Nos. 5,574,127 and 6,162,877, respectively, the disclosure of which is herein incorporated by reference.

Cyclodextrins (CDs) are cyclic oligosaccharides with six to twelve alpha-D-anhydroglucose units connected together by alpha-(1,4) linkages. They are well known in the art and commercially available. The cyclodextrins composed of six, seven and eight anhydroglucose rings are referred to as alpha ($\alpha$)-, beta ($\beta$)- and gamma ($\gamma$)-cyclodextrin respectively. These truncated cone-shaped molecules are characterized by having a hydrophobic cavity and a relatively hydrophilic exterior. One of the unique properties of CDs is their ability to include appropriate hydrophobic compounds in their cavity to form host-guest complexes.

Cyclodextrins are produced from starch of any selected plant variety, such as corn, potato, waxy maize, and the like which may be modified or unmodified starch derived from cereal or tuber origin and the amylose or amylopectin fractions thereof. The selected starch in the form of an aqueous slurry, at concentrations up to about 35% by weight solids, is usually liquefied, by gelatinization or treatment with a liquefying enzyme such as bacterial alpha-amylase enzyme, and then subjected to treatment with a glycosyltransferase to form the cyclodextrins. The amount of individual alpha-, beta-, and gamma-cyclodextrin formed will vary depending on the selected starch, selected glycosyltransferase and processing conditions. Precipitation and separation of the individual cyclodextrins are described in the literature using solvent systems, inclusion compounds such as trichloroethylene and non-solvent systems using selected ion exchange resins. Each of the cyclodextrins as well as mixtures thereof is commercially available. Beta-cyclodextrin is by far the most widely used form and is known for use in the production of pharmaceuticals and foods.

The property of cyclodextrin molecules that makes them useful for the present invention is that the molecule has an apolar, hydrophobic cavity which can contain hydrophobic molecules called guest molecules (or the hydrophobic portions of amphiphilic molecules) of appropriate sizes to fit inside the cavity and thus form inclusion complexes. One would therefore be led to believe that polar solvents would not have a sufficient affinity for the cavity and would not displace the more hydrophobic guests. In the search for a compatible, nondestructive, liquid or meltable carrier for the cyclodextrin complexes it has been found that most polar solvents, e.g., the hydroxy and polyhydroxy solvents, e.g., low molecular weight alcohol, ethylene glycol, 1,2-propanediol, glycerol and molten sorbitol, at least partially decompose the inclusion complexes and release some of the guest molecules. Surprisingly, it is now found that some liquid or meltable solids, as described hereinafter, can be used to make pumpable, fluid slurries of cyclodextrin complexes at typical process temperatures, e.g., at about 100–120° C. or lower, without decomposing the cyclodextrin complexes.

Because of this property of the cyclodextrin to form complexes with hydrophobic species, hydrophobic moieties of associative thickeners can bind (get capped) with CDs. The binding of cyclodextrin compounds with the hydrophobic moieties of associative thickeners disrupts the intermolecular hydrophobic associations and causes a suppression of the viscosity of an aqueous solution containing the associative thickener. The cyclodextrin compounds can then be readily dissociated or decomplexed from the associative thickener by the addition of another material which has a greater affinity for the cyclodextrin or by dilution with water.

The beta-cyclodextrin and its ethoxylated and propoxylated derivatives are useful in latex paint formulation for achieving a variety of effects, such as for example: to permit the preparation and supply of a low viscosity, high solids solution of the thickener without the use of viscosity suppressing solvent; improving the ease of incorporating hydrophobically modified associative thickeners, having marginal solubility in water, into aqueous systems; to reduce the viscosity drop of associative thickeners containing formulations upon the addition of colorants or surfactants to the formulation; to improve the efficiency of the associative thickener itself, thus reducing the thickeners required to reach a given paint viscosity; to reduce foaming in a paint, with or without an associative thickener, which is especially desirable when the paint is to be applied by a roller; and to reduce the color development problems caused by surfactants in some formulations.

Materials that have an affinity for the cyclodextrin and that cause the decomplexing or desorbing of the cyclodextrin from the HM-PAPE in the aqueous water-insoluble polymer system are surfactants (i.e., nonionic, cationic, and anionic). These surfactants are readily available in latex formulations. Other solvents that have an affinity for cyclodextrin are hydroxyl-containing materials such as alcohols. Ethanol is a good example of such an alcohol.

According to the present invention, normally the lower limit of the solids content of the HM-PAPE and/or the comb HM-PAPE in the composition is 3% by weight of the composition, preferably 7%, and more preferably 10%. The upper limit of the polymer solid content is 35% by weight, preferably 25% by weight, and more preferably 20% by weight. Generally, the cyclodextrin content lower limit is 0.2% by weight based on the total weight of the composition, preferably 0.5% by weight, and more preferably 0.7% by weight. The upper limit of the cyclodextrin is generally 7.0% by weight, preferably 3.0%, by weight, and more preferably 1.5% by weight.

According to the present invention, in aqueous solutions containing low concentrations of HM-PAPE solids, for example on the order of about 3% by weight, it was found that the unmodified cyclodextrins, including beta-cyclodextrin, are effective viscosity suppressing additives, while in aqueous solutions containing high concentrations of HM-PAPE solids, for example on the order of greater than about 10% by weight, it was found that the modified cyclodextrins, having increased water solubility on the order of about 50 grams per 100 grams water, are preferred.

In accordance with this invention, the amount of the cyclodextrin species needed to form a target solution depends on the type of HM-PAPE, its concentration in solution and the type of cyclodextrin used to suppress the solution viscosity. Cyclodextrin or cyclodextrin derivatives having water-solubility greater than 0.1% can be used to practice the present invention. Examples of water-soluble cyclodextrin derivatives include methylated, hydroxyethylated, hydroxypropylated, carboxymethylated, and diaminoethylated cyclodextrins. The cyclodextrin derivatives can be nonionic, cationic and anionic. Other hydrophilic cyclic molecules, such as calixarenes, having hydrophobic cavity and ability to complex with the hydrophobes of associative thickeners can also be used.

In accordance with this invention, the HM-PAPE and comb HM-PAPE compositions can be used in film forming coating compositions such as latex paints, the pigment volume concentration (PVC) of the latex paint can have a lower limit of 15, preferably 24, and more preferably 35%. The upper limit of the PVC is normally 85, preferably 65%. According to the jargon of the paint industry, when the latex paint is a high gloss paint, the PVC is from about 15% to about 30%; when the paint is a semi-gloss paint, the PVC is from about 20 to about 35%; and when it is a flat paint, the PVC is from about 40 to about 80%. Also, for latex paints the ICI viscosity should be above about 1.5 Pa.s at 25° C., for good performance.

The basic latex paint contains besides the latex, pigments, fillers, surfactants, cosolvents, and thickeners. Other additives that can be included in paint formulations, for example, are biocides, dispersants, coalescing agents, preservatives, defoamers, and wet-edge agents.

EXAMPLES

The viscosity of all the solutions in the following Examples was measured using a digital Brookfield viscometer (Model LVDV-1+) at 25° C. at 30 rpm unless mentioned otherwise. All percentages and parts are by weight unless otherwise mentioned.

Example 1

Preparation of a Solid Blend of HM-PAPE and Methylated β-Cyclodextrin

This Example shows how by intimately blending methylated β-cyclodextrin with a HM-PAPE, the solution viscosity of the latter can be lowered.

Aquaflow™ NLS-200 HM-PAPE solid (1000 g) (available from Hercules Incorporated, Wilmington, Del.) and methylated beta-cyclodextrin (50 g) (available from Cerestar USA, Inc., Hammond, Ind.) were added to a ribbon blender and the resulting mixture heated under a nitrogen atmosphere at 110° C. for 1 hour with constant agitation. After that the molten mass was discharged and cooled to room temperature, a homogeneous solid was obtained. There was no change in the molecular composition (molecular weight and hydrophobe content) of the HM-PAPE after it was heated with methylated beta-cyclodextrin.

The HM-PAPE/methylated beta-cyclodextrin blend was ground to fine particles and its solubility behavior was tested. It dissolved rapidly in water without lumping or foaming to form a smooth solution. The 15% solids solution Brookfield viscosity of the blend was 668 cps. By contrast, in the absence of methylated beta-cyclodextrin, the HM-PAPE lumped, took a longer time to dissolve and caused foaming. The lower solution viscosity of the blend relative to that of the pure HM-PAPE (15% solution Brookfield viscosity >20,000 cps) clearly showed that by adding methylated beta-cyclodextrin, the viscosity of the HM-PAPE could be drastically lowered.

Example 2

This Example demonstrates the efficacy of hydroxypropylated beta-cyclodextrin to lower the viscosity of Aquaflow NHS-300 HM-PAPE.

Aquaflow NHS-300 HM-PAPE solid (available from Hercules Incorporated, Wilmington, Del.) (20 g) was dissolved in water (80 g) and the solution pH adjusted to 7.5. To this solution various amounts of hydroxypropylated beta-cyclodextrin (HP-β-CD) (available from Cerestar USA, Inc., Hammond, Ind.) were added. The results are shown in Table 1, below.

TABLE I

| Amount of HP-β-CD added (gram) | Solution BF viscosity @ 26° C. (cps) |
| --- | --- |
| 0.5 | 5950 |
| 0.6 | 2780 |
| 1.0 | 1580 |
| 1.5 | 940 |
| 2.0 | 560 |
| 2.75 | 360 |

As can be seen from data in the table, the solution viscosity of Aquaflow (R) NHS-300 HM-PAPE steadily decreased as the amount of HP-β-CD was increased.

Example 3

This Example shows the efficacy of beta-cyclodextrin to lower the viscosity of high solids solution of Aquaflow™ NHS-300 HM-PAPE.

Aquaflow™ NHS-300 HM-PAPE solid (20 g) was dissolved in water (80 g) and the solution pH was adjusted to 7.5. To this solution various amounts of beta-cyclodextrin (β-CD) (available from Cerestar USA, Inc., Hammond, Ind.) were added. The results are shown in Table 2, below.

TABLE 2

| Amount of β-CD added (gram) | Solution BF viscosity (cps) |
|---|---|
| 0 | 5950 |
| 0.50 | 2508 |
| 1.0 | 1268 |
| 1.5 | 775 |
| 2.0 | 533 |
| 3.0 | 242 |
| 4.0 | 200 |

As can be seen from data in the above Table 2, the solution viscosity of Aquaflow™ NHS-300 HM-PAPE steadily decreased as the amount of β-CD was increased.

Example 4

This Example shows the efficacy of methylated beta-cyclodextrin to lower the viscosity of high solids (20%) solution of Aquaflow™ NHS-300 HM-PAPE.

Aquaflow™ NHS-300 HM-PAPE solid (20 g) was dissolved in water (80 g) and the solution pH adjusted to 7.5. To this solution various amounts of methylated beta-cyclodextrin (Me-β-CD) were added. The results are shown in Table 3, below.

TABLE 3

| Amount of Me-β-CD added (gram) | Solution BF viscosity (cps) |
|---|---|
| 0 | 5950 |
| 0.50 | 1956 |
| 1.0 | 952 |
| 1.5 | 485 |
| 2.0 | 308 |

As can be seen from data in the above Table 3, the solution viscosity of Aquaflow™ NHS-300 HM-PAPE steadily decreased as the amount of Me-β-CD was increased.

Example 5

This Example shows the efficacy of methylated beta-cyclodextrin to lower the viscosity of high solids (25%) solution of Aquaflow™ NHS-300 HM-PAPE.

Aquaflow™ NHS-300 HM-PAPE solid (25.3 g; "as is") was dissolved in water (75 g). To this solution various amounts of methylated beta-cyclodextrin (Me-β-CD) was added. The results are shown in Table 4, below.

TABLE 4

| Amount of Me-β-CD added (gram) | Solution BF viscosity @ 28° C. (cps) |
|---|---|
| 0 | 14220 |
| 1.0 | 1970 |
| 1.5 | 1288 |
| 2.0 | 920 |
| 2.5 | 645 |

As can be seen from data in Table 4, the 25% solids solution viscosity of Aquaflow™ NHS-300 HM-PAPE steadily decreased as the amount of Me-β-CD was increased.

Example 6

This Example shows the efficacy of methylated beta-cyclodextrin to lower the viscosity of high solids solution of an Aquaflow™ NLS-200 HM-PAPE.

Aquaflow™ NLS-200 HM-PAPE solid (available from Hercules Incorporated, Wilmington, Del.) (17.5 g; "as is") was dissolved in water (83 g). To this solution various amounts of methylated beta-cyclodextrin (Me-β-CD) were added. The results are shown in Table 5, below.

TABLE 5

| Amount of Me-β-CD added (gram) | Solution BF viscosity @ 28° C. (cps) |
|---|---|
| 0 | >20,000 |
| 0.56 | 6940 |
| 0.79 | 4500 |
| 1.19 | 2328 |
| 1.49 | 1580 |
| 1.84 | 930 |

As can be seen from data in Table 5, the solution viscosity of Aquaflow™ NLS-200 HM-PAPE steadily decreased as the amount of Me-β-CD was increased.

Example 7

This Example shows the efficacy of beta-cyclodextrin to lower the viscosity of high solids solution of an Aquaflow™ NLS-200 HM-PAPE.

Aquaflow™ NLS-200 HM-PAPE solid (17.5 g; "as is") was dissolved in water (83 g). To this solution various amounts of beta-cyclodextrin (β-CD) were added. The results are shown in Table 6, below.

TABLE 6

| Amount of β-CD added (gram) | Solution BF viscosity @ 35° C. (cps) |
|---|---|
| 0 | >20,000 |
| 0.6 | >20,000 |
| 1.0 | 16450 |
| 2.02 | 5300 |
| 3.02 | 1450 |

As can be seen from data in Table 6, the solution viscosity of Aquaflow™ NLS-200 HM-PAPE steadily decreased as the amount of β-CD was increased.

Example 8

20 This Example shows the efficacy of hydroxypropylated beta-cyclodextrin to lower the viscosity of high solids solution of an Aquaflow™ NLS-200 HM-PAPE.

Aquaflow™ NLS-200 HM-PAPE solid (17.5 g; "as is") was dissolved in water (83 g). To this solution various amounts of hydroxypropylated beta-cyclodextrin (HP-β-CD) were added. The results are shown in Table 7, below.

TABLE 7

| Amount of HP-β-CD added (gram) | Solution BF viscosity @ 35° C. (cps) |
|---|---|
| 0 | >20,000 |
| 0.56 | >20,000 |
| 1.0 | 15,800 |
| 1.5 | 9080 |
| 2.0 | 6080 |
| 2.75 | 3340 |
| 3.35 | 1980 |

As can be seen from data in Table 7, the solution viscosity of Aquaflow™ NLS-200 HM-PAPE steadily decreased as the amount of HP-β-CD was increased.

High solids solutions (>15%) of Aquaflow™ NLS-200 HM-PAPE using HP-β-CD were also made and evaluated in the Rhoplex AC-417M all-acrylic semi-gloss paint. It was found that the basic rheological properties of Aquaflow™ NLS-200 HM-PAPE delivered in conjunction with HP-β-CD were equivalent to those for the same Aquaflow™ NLS-200 HM-PAPE delivered using 4:1 water/butyl carbitol mixture.

Example 9

This Example shows the efficacy of methylated beta-cyclodextrin to lower the viscosity of high solids (17%) solution of an Aquaflow™ NLS-200 HM-PAPE.

Aquaflow™ NLS-200 HM-PAPE solid (17.5 g; "as is") was dissolved in water (83 g). To this solution various amounts of methylated beta-cyclodextrin (Me-β-CD) were added. The results are shown in Table 8, below.

TABLE 8

| Amount of Me-β-CD added (gram) | Solution BF viscosity @ 28° C. (cps) |
|---|---|
| 0 | >20,000 |
| 0.56 | 6940 |
| 0.79 | 4500 |
| 1.19 | 2328 |
| 1.49 | 1580 |
| 1.84 | 930 |

As can be seen from data in Table 8, the solution viscosity of Aquaflow™ NLS-200 HM-PAPE steadily decreased as the amount of Me-β-CD was increased.

Example 10

This Example shows the efficacy of hydroxypropylated beta-cyclodextrin to lower the viscosity of high solids (17%) solution of an Aquaflow™ NLS-200 HM-PAPE.

Aquaflow™ NLS-200 HM-PAPE solid (17.5 g; "as is") was dissolved in water (83 g). To this solution various amounts of hydroxypropylated beta-cyclodextrin (HP-β-CD) were added. The results are shown in Table 9, below.

TABLE 9

| Amount of HP-β-CD added (gram) | Solution BF viscosity @ 35° C. (cps) |
|---|---|
| 0 | >20,000 |
| 0.56 | >20,000 |
| 1.0 | 15,800 |
| 1.5 | 9080 |
| 2.0 | 6080 |
| 2.75 | 3340 |
| 3.35 | 1980 |

As can be seen from data in Table 9, the solution viscosity of Aquaflow™ NLS-200 HM-PAPE steadily decreased as the amount of HP-β-CD was increased.

Example 11

This Example shows the efficacy of methylated beta-cyclodextrin to lower the viscosity of high solids solution of an Aquaflow™ NLS-210 HM-PAPE.

Aquaflow™ NLS-210 HM-PAPE solid (available from Hercules Incorporated, Wilmington, Del.) (17.4 g; "as is") was dissolved in water (83 g). To this solution various amounts of methylated beta-cyclodextrin (Me-β-CD) were added. The results are shown in Table 10, below.

TABLE 10

| Amount of Me-β-CD added (gram) | Solution BF viscosity @ 26° C. (cps) |
|---|---|
| 0 | >20,000 |
| 0.8 | 5940 |
| 1.3 | 3440 |
| 1.7 | 2200 |
| 2.1 | 1392 |
| 2.5 | 796 |

As can be seen from data in Table 10 above, the solution viscosity of Aquaflow™ NLS-210 HM-PAPE steadily decreased as the amount of Me-β-CD was increased.

Example 12

This Example shows the efficacy of hydroxypropylated beta-cyclodextrin to lower the viscosity of high solids solution of an Aquaflow™ NLS-210 HM-PAPE.

Aquaflow™ NLS-210 HM-PAPE solid (17.4 g; "as is") was dissolved in water (83 g). To this solution various amounts of hydroxypropylated beta-cyclodextrin (HP-β-CD) were added. The results are shown in Table 11, below.

TABLE 11

| Amount of HP-β-CD added (gram) | Solution BF viscosity @ 36° C. (cps) |
|---|---|
| 0 | >20,000 |
| 2.0 | >15,000 |
| 3.0 | 8400 |
| 4.0 | 5700 |
| 2.0 | 6080 |
| 5.0 | 2680 |
| 6.0 | 1210 |

As can be seen from data in Table 11 above, the solution viscosity of Aquaflow™ NLS-210 HM-PAPE steadily decreased as the amount of HP-β-CD was increased.

Example 13

This Example shows the efficacy of various β-cyclodextrins to lower the viscosity of hydrophobically modified comb polyacetal-polyethers.

The hydrophobically modified comb polymer used in these experiments was made as described below.

To an Abbe ribbon blender were added polyethylene glycol (MW~8000) (PEG-8000) (1000 g), 1-hexadecylamine (8 g), and sodium hydroxide (34 g). After sealing the reactor, the mixture was heated at 80° C. for one hour. Then dibromomethane (20.4 g) was added to the PEG-8000/1-hexadecylamine/NaOH mixture and the resulting reaction mixture heated at 80° C. for four hours to form the resulting comb copolymer. To this comb polymer at 80° C. was added 1-bromohexadecane (70 g) and the resulting reaction mixture heated at 120° C. for two hours. Following this, the reactor was opened and the molten reaction mixture was poured into a plastic tray. After cooling to room temperature, the reaction mixture solidified. The weight average molecular of the copolymer was 58,300 with a polydispersity index of 1.96. The 2% aqueous solution Brookfield viscosity of the copolymer was 520 cps.

To an aqueous solution (100 g) (polymer content ~9.8%) of this copolymer, various amounts of β-cyclodextrin, hydroxypropylated β-cyclodextrin and methylated β-cyclodextrin were added and the mixture was mixed till the added cyclodextrin dissolved. The viscosities in the presence of various types and amounts of β-cyclodextrins are shown in Table 12, below.

TABLE 12

| Amount of cyclodextrin (CD) added (g) | Brookfield viscosity in the presence of β-CD[a] (cps) | Brookfield viscosity in the presence of HP-β-CD[b] (cps) | Brookfield viscosity in the presence of Me-β-CD[c] (cps) |
|---|---|---|---|
| 0 | >20,000 | >20,000 | >20,000 |
| 0.5 | 2168 | 4880 | 665 |
| 1.0 | 321 | 1172 | 115 |
| 1.5 | 66 | 270 | 62 |

[a]β-CD = β-Cyclodextrin;
[b]HP-β-CD = Hydroxypropylated β-cyclodextrin;
[c]Me-β-CD = Methylated β-cyclodextrin As can be seen from Table 12 above, the hydrophobically modified comb polymer underwent significant viscosity loss in the presence of various β-cyclodextrins.

Example 14

The hydrophobically modified comb polymer used in these experiments was made by copolymerizing polyethylene glycol (MW~8000) (1000 g), RHODAMEEN T-50 (available from Rhodia, Inc., New Jersey) (44.5 g), dibromomethane (17.1 g) in the presence of sodium hydroxide (35 g) and then reacting the resulting comb copolymer with 1-bromohexadecane (90 g) according to the reaction conditions described in Example 13, above. The weight average molecular of the comb copolymer was 38,100 with a polydispersity index of 1.83. The 2% aqueous solution Brookfield viscosity of the copolymer was 665 cps.

To an aqueous solution (100 g) (polymer content ~9.7%) of this copolymer, various amounts of β-cyclodextrin and hydroxypropylated β-cyclodextrin were added and the mixture was mixed till the added cyclodextrin dissolved. The viscosities in the presence of various amounts of β-cyclodextrin and hydroxypropylated β-cyclodextrin are shown below.

TABLE 13

| Amount of cyclodextrin (CD) added (g) | Brookfield viscosity in the presence of β-CD (cps) | Brookfield viscosity in the presence of HP-β-CD (cps) |
|---|---|---|
| 0 | >20,000 | >20,000 |
| 0.5 | 19886 | 15860 |
| 1.0 | 4400 | 980 |
| 2.0 | 215 | 980 |
| 3.0 | 68 | 150 |

As can be seen from Table 13 above, the aqueous solution of the hydrophobically modified comb polymer underwent significant viscosity loss as increasing amount of β-cyclodextrin and hydroxypropylated β-cyclodextrin was added.

Example 15

The hydrophobically modified comb polymer used in these experiments was made using the following reagents:
a) PEG-8000—1000 g,
b) RHODAMEEN T-50—44.5 g, (available from Rhodia, Inc., New Jersey)
c) Sodium hydroxide—35 g,
d) Dibromomethane—19 g, and
e) 1-Bromohexadecane—100 g.

The reaction conditions were the same as those described in Example 13 above.

To an aqueous solution (100 g) (polymer content ~9.6%) of this copolymer, various amounts of β-cyclodextrin and hydroxypropylated β-cyclodextrin were added and the mixture was mixed till the added cyclodextrin dissolved. The viscosities in the presence of various amounts of β-cyclodextrin and hydroxypropylated β-cyclodextrin are shown in Table 14, below.

TABLE 14

| Amount of cyclodextrin (CD) added (g) | Brookfield viscosity in the presence of β-CD (cps) | Brookfield viscosity in the presence of HP-β-CD (cps) |
|---|---|---|
| 0 | >20,000 | >20,000 |
| 0.5 | 1884 | 3500 |
| 1.0 | 408 | 822 |
| 2.0 | 250 | 328 |

As can be seen from Table 14 above, the aqueous solution of the hydrophobically modified comb polymer underwent significant viscosity loss as increasing amount of β-cyclodextrin and hydroxypropylated β-cyclodextrin was added.

Example 16

This Example demonstrates the efficacy of α-cyclodextrin (α-CD) to lower the viscosity of Aquaflow™ NHS-300 HM-PAPE.

Aquaflow™ NHS-300 HM-PAPE solid (available from Hercules Incorporated, Wilmington, Del.) (20 g) was dissolved in water (80 g). To this solution were added various amounts of α-CD (available from Cerestar USA, Inc., Hammond, Ind.). The results are shown in Table 15, below.

TABLE 15

| Amount of α-CD added (gram) | Solution BF viscosity @ 26° C. (cps) |
|---|---|
| 0.30 | 3340 |
| 0.60 | 2072 |
| 0.90 | 1264 |

As can be seen from data in Table 15 above, the solution viscosity of Aquaflow™ NHS-300 HM-PAPE steadily decreased as the amount of α-CD was increased.

Example 17

This Example demonstrates the efficacy of γ-cyclodextrin (γ-CD) to lower the viscosity of Aquaflow™ NLS-200 HM-PAPE.

Aquaflow™ NLS-200 HM-PAPE solid (available from Hercules Incorporated, Wilmington, Del.) (10 g) was dissolved in water (90 g). To this solution were added various amounts of γ-CD (available from Cerestar USA, Inc., Hammond, Ind.). The results are shown in Table 16, below.

TABLE 16

| Amount of γ-CD added (grams) | Solution BF viscosity (cps) |
| --- | --- |
| 0 | >20,000 |
| 0.30 | >20,000 |
| 0.60 | 17,480 |
| 0.90 | 12,300 |
| 1.20 | 9,340 |
| 1.50 | 7,200 |
| 1.80 | 4,580 |

As can be seen from data in Table 16 above, the solution viscosity of Aquaflow™ NLS-200 HM-PAPE steadily decreased as the amount of γ-CD was increased.

Paint Properties of Cyclodextrin-containing HM-PAPEs

The appropriate cyclodextrin-containing HM-PAPE solution was incorporated into a flat, eggshell and high gloss paint formula to achieve an initial Stormer viscosity of 90–95 Kreb Units. The ingredients used in these formulas are described below. The significance and scale of various paint properties are as follows:

a) Stormer viscosity (initial and after overnight storage) (I/O) is measured by a Stormer viscometer at 200 sec$^{-1}$ shear rate and expressed in Kreb Units (KUs).
b) ICI viscosity is measured by an ICI plate and cone viscometer at 12,000 sec$^{-1}$ and expressed in poise.
c) Thickening efficiency (TE) is measured as dry weight % thickener in the paint to achieve the initial Stormer viscosity.
d) Leveling by Leneta method (measured on a scale 0–10; 0=worst; and 10=best).
e) Sag resistance by Leneta method, mid range bar, wet film thickness (WFT) (in mils) above which sag occurs.
f) Spatter resistance by roll-out over a black panel (compared on scale of 0–10; 0=worst and 10=best).
g) 60° Gloss is specular gloss viewed at 60°.

Example 18

UCAR® 367 Vinyl-acrylic Latex Based Interior Flat Paint Formula

A high solids solution was made by dissolving 18.3 g ("as is") of Aquaflow™ NLS-200 HM-PAPE solid in a solution of hydroxypropylated β-cyclodextrin (5 g) in water (83 g). The resulting polymer solution was evaluated in a UCAR® 367 vinyl-acrylic latex based interior flat paint formula described in U.S. Pat. No. 5,879,440. The paint properties of this thickener solution against a control Aquaflow™ NLS-200 HM-PAPE solution (25 g of the polymer dissolved in 1:4 (w/w) mixture of butyl carbitol and 75 g of water) are compared below in Table 17.

TABLE 17

| Thickener | TE (wt %) | KU (I/O) | ICI Viscosity (poise) | Leveling | Sag resistance | Spatter |
| --- | --- | --- | --- | --- | --- | --- |
| Aquaflow(™) NLS 200 (control) | 0.50 | 94/109 | 2.3 | 9 | 6 | 9 |
| Cyclodextrin-containing Aquaflow(™) NLS 200 | 0.50$^a$ | 93/110 | 2.4 | 9 | 6 | 9 |

$^a$TE based on the pure HM-PAPE

As can be seen from above results in Table 17, the performances of the HM-PAPE were not adversely affected in the presence of hydroxypropylated β-cyclodextrin.

Example 19

UCAR® 379/UCAR 625 Vinyl-acrylic/Acrylic Eggshell Paint Formula

The above thickener solutions were also evaluated in UCAR 367/UCAR 625 (vinyl-acrylic/acrylic) eggshell paint formula. The details of the UCAR 367/625 eggshell paint formula are given in TABLE 18 below.

TABLE 18

Base Paint (pigment grind)

| Ingredient | Grams/1000 grams | Manufacturer |
| --- | --- | --- |
| Water | 113.6 | |
| Nuosept-95 Preservative | 2.35 | Hüls America, New Jersey |
| Tamol 731 (Dispersant) | 9.4 | Rohm & Haas Company, Pennsylvania |
| Triton N-57 surfactant (Dispersant) | 2.4 | The Dow Chemical Company, Michigan |
| 2-Amino-2-methyl-1-propanol (AMP-95) | 1.0 | The Dow Chemical Company, Michigan |
| Propylene glycol | 52.8 | The Dow Chemical Company, Michigan |
| Colloid-643 Antifoam Water, Discretionary (as needed for effective dispersion) | 1.9 | Rhodia, Inc., New Jersey |
| Ti-Pure ® R-900 titanium dioxide | 229.3 | E. I. DuPont de Nemours & Co., Delaware |
| Optiwhite pigment | 102 | Burgess Pigment co., Georgia |
| Burgess No. 98 pigment | 25.5 | Burgess Pigment co., Georgia |

Letdown

| Ingredient | Amount (grams) | Manufacturer |
| --- | --- | --- |
| UCAR ® Filmer IBT | 12 | The Dow Chemical Company, Midland, Michigan |
| UCAR ® 379 Vinyl-acrylic latex | 319.5 | The Dow Chemical Company, Midland, Michigan |
| UCAR ® 625 Acrylic latex | 113.2 | The Dow Chemical Company, Midland, Michigan |
| Butyl Carbitol ® coalescent | 12 | The Dow Chemical Company, Midland, Michigan |
| Colloid-643 Antifoam | 2.9 | Rhodia, Inc., New Jersey |

Disperse to Hegman 4 to 5 and letdown at slower speed.

The above base paint (230 g) was mixed with an appropriate amount (15 g) of water/thickener solution to adjust the Stormer viscosity of the paint to 97±2 KU. The paint properties of the thickeners are given in Table 20, below.

TABLE 20

| Thickener | TE (wt %) | KU (I/O) | ICI Viscosity (poise) | Leveling | Sag resistance | Spatter |
| --- | --- | --- | --- | --- | --- | --- |
| Aquaflow(™) NLS-200 (control) | 0.53 | 97/113 | 3.2 | 9 | 12 | 9 |
| Cyclodextrin-containing Aguaflow(™) NLS-200 | 0.54$^a$ | 94/109 | 3.1 | 9 | 10 | 9 |

$^a$TE based on the pure HM-PAPE

As can be seen from above results in Table 20, the performances of the HM-PAPE were not adversely affected in the presence of hydroxypropylated β-cyclodextrin.

Example 20

Rhoplex HG-74P Styrene-acrylic High Gloss Paint Formula

A high solids solution was made by dissolving 20.3 g ("as is") of Aquaflow™ NHS-300 HM-PAPE solid in solutions of various types of β-cyclodextrins (1.0-1.5 g) in water (80 g). The resulting polymer solutions were evaluated in the above Rhoplex HG-74P styrene-acrylic latex based high gloss paint formula. The paint properties of these cyclodextrin-containing thickener solutions were compared against those of a control Aquaflow™ NHS-300 HM-PAPE solution (20.3 g of the polymer dissolved in 80 g of water).

The details of the Rhoplex HG-74P styrene-acrylic high gloss paint formula are given in TABLE 21 below.

TABLE 21

| Ingredients | Pounds | Gallons | Manufacturer |
| --- | --- | --- | --- |
| Water | 40.00 | 4.80 | |
| Propylene Glycol | 45.00 | 5.19 | The Dow Chemical Co., Midland, Michigan |
| Butyl Carbitol | 32.00 | 4.00 | The Dow Chemical Co., Midland, Michigan |
| Proxel GXL | 2.00 | 0.24 | The Dow Chemical Co., Midland, Michigan |
| Rhodaline 111M | 12.00 | 1.30 | Rhodia, Inc., New Jersey |
| Triton CF-10 | 2.00 | 0.22 | The Dow Chemical Co., Midland, Michigan |
| Colloid 640 | 2.00 | 0.26 | Rhodia, Inc., New Jersey |
| 2-Amino-2-methyl-1-propanol (AMP-95) | 1.00 | 0.13 | The Dow Chemical Co., Midland, Michigan |
| Strodex PK-90 | 1.00 | 0.11 | Dexter, Illinois |
| Tronox CR-828 | 225.00 | 6.60 | Kerr-McGee, Oklahoma City, Oklahoma |

Grind to Hegman >8 and letdown at slower speed to the mixture of ingredients shown below.

| Letdown | Rhoplex HG-74P Styrene-acrylic latex | 620.00 | 69.66 | Rohm & Haas Company, Philadelphia, Pennsylvania |
| --- | --- | --- | --- | --- |
| | Colloid 640 | 2.00 | 0.26 | Rhodia, Inc., New Jersey |
| | Post addition premix | 60.00 | 7.20 | |
| | Total | 1044.00 | 100.0 | |

Formula Constants

TABLE 21-continued

| | |
| --- | --- |
| Pigment volume concentration, % | 19.94 |
| Nonvolatile volume, % | 33.1 |
| Nonvolatile weight, % | 46.5 |
| Coalescent on latex, % | 12.3 |
| Dispersant on pigment, % | 1.3 |

The above base paint (246 pounds) set forth in Table 21 was thickened with thickener/water mixture (15 pounds) to achieve an initial Stormer viscosity of 95±5 KU. The paint properties of the cyclodextrin-free (control sample) and cyclodextrin-containing Aquaflow™ NHS-300 solutions are shown in Table 22, below.

TABLE 22

| Thickener | Cyclodextrin type/amount (g) | TE[a] (wt %) | KU (I/O) | ICI Viscosity (poise) | Leveling | Sag resistance | Spatter | 60° Gloss |
| --- | --- | --- | --- | --- | --- | --- | --- | --- |
| Aquaflow(™) NHS-300 (control) | — | 0.30 | 98/98 | 3.2 | 10 | 6 | 9 | 75 |
| Cyclodextrin-containing Aquaflow(™) NHS-300 | ®-CD/1.0 | 0.30 | 97/98 | 3.2 | 10 | 8 | 9 | 74 |
| " | HP-®-CD/1.5 | 0.30 | 97/97 | 3.1 | 10 | 6 | 9 | 76 |
| " | Me-®-CD/1.0 | 0.30 | 96/97 | 3.1 | 10 | 6 | 9 | 73 |

[a]TE based on solids content of the thickener solution.

As can be seen from above results in Table 22, the performances of the cyclodextrin-containing Aquaflow™ NHS-300 were not adversely affected in the presence of various types of cyclodextrins.

Although this invention has been described with respect to specific embodiments, it should be understood that these embodiments are not intended to be limiting and that many variations and modifications are possible without departing from the spirit and scope of this invention.

What is claimed is:

1. A composition comprising
   a) a hydrophobically modified polyacetal-polyether or comb hydrophobically modified polyacetal-polyether and
   b) a viscosity suppressing agent selected from the group consisting of cyclodextrins and derivatives thereof, wherein the lower limit of the solids content of the polymer is 10 wt %.

2. The composition of claim 1, wherein the cyclodextrins are selected from the group consisting of alpha (α), beta (β), and gamma (γ) cyclodextrins.

3. The composition of claim 1, wherein the cyclodextrin derivatives are selected from the group consisting of methylated, hydroxyethylated, hydroxypropylated, carboxymethylated, and diaminoethylated cyclodextrins.

4. The composition of claim 1, wherein the lower limit of the hydrophobe types has 8 carbons.

5. The composition of claim 1, wherein the lower limit of the hydrophobe types has 10 carbons.

6. The composition of claim 1, wherein the lower limit of the hydrophobe types has 12 carbons.

7. The composition of claim 1, wherein the upper limit of the hydrophobe types has 40 carbons.

8. The composition of claim 1, wherein the upper limit of the hydrophobe types has 28 carbons.

9. The composition of claim 1, wherein the upper limit of the hydrophobe types has 18 carbons.

10. The composition of claim 1, wherein the upper limit of the solids content of the polymer is 35 wt %.

11. The composition of claim 1, wherein the upper limit of the solids content of the polymer is 25 wt %.

12. The composition of claim 1, wherein the upper limit of the solids content of the polymer is 20 wt %.

13. The composition of claim 1, wherein the lower limit of the cyclodextrin content is 0.2 wt %.

14. The composition of claim 1, wherein the lower limit of the cyclodextrin content is 0.5 wt %.

15. The composition of claim 1, wherein the lower limit of the cyclodextrin content is 0.7 wt %.

16. The composition of claim 1, wherein the upper limit of the cyclodextrin content is 7.0 wt %.

17. The composition of claim 1, wherein the upper limit of the cyclodextrin content is 3.0 wt %.

18. The composition of claim 1, wherein the upper limit of the cyclodextrin content is 1.5 wt %.

19. The composition of claim 1, wherein the solids content of the polymer is 20 wt % and the cyclodextrin content is 1.0 wt %.

20. The composition of claim 1, wherein the solids content of the polymer is 17 wt % and the cyclodextrin content is 3.0 wt %.

21. A method for improving the incorporation of a thickener of a hydrophobically modified polyacetal-polyether (HM-PAPE) or comb hydrophobically modified polyacetal-polyether (comb HM-PAPE) into an aqueous system containing a water-insoluble polymer comprising a) admixing a cyclodextrin or cyclodextrin derivative with said thickener in a sufficient amount to effectively complex the thickener so as to keep the viscosity of the admixture in abeyance, b) adding said complexed admixture to said aqueous system containing said water-insoluble polymer, and c) adding or providing to said aqueous system containing said complexed admixture and said water-insoluble polymer system an effective amount of a compound having an affinity for the cyclodextrin to decomplex the cyclodextrin from the thickener to increase the viscosity of the system.

22. The method of claim 21, wherein the cyclodextrin is selected from the group consisting of alpha ($\alpha$), beta ($\beta$), and gamma ($\gamma$) cyclodextrins and mixtures thereof.

23. The process of claim 22, wherein the cyclodextrin is selected from the group consisting of methylated, hydroxyethylated, hydroxypropylated, carboxymethylated, and diaminoethylated cyclodextrins and mixtures thereof.

* * * * *